US006567397B1

United States Patent
Campana, Jr. et al.

(10) Patent No.: US 6,567,397 B1
(45) Date of Patent: May 20, 2003

(54) SYSTEM AND METHOD FOR WIRELESS EXCHANGE OF DATA IN A NON-REAL-TIME DATA COMMUNICATIONS SYSTEM

(75) Inventors: Thomas J. Campana, Jr., Orland Park, IL (US); Robert Fries, Bolingbrook, IL (US); Paul Iacopetti, St. Charles, IL (US); Al Jewer, Fort Atkinson, WI (US); Edward C. Pienkowski, Elburn, IL (US); Michael P. Ponschke, Sr., Lockport, IL (US); Gib Scott, Lexington, NC (US); Thomas Smigelski, Lake Zurich, IL (US); Gordon Smith, Geneva, IL (US)

(73) Assignee: Sophia Communications, Inc., Burridge, IL (US)

( * ) Notice: Subject to any disclaimer, the term of this patent is extended or adjusted under 35 U.S.C. 154(b) by 0 days.

(21) Appl. No.: 09/500,963

(22) Filed: Feb. 15, 2000

(51) Int. Cl.$^7$ ................................................. H04J 3/24
(52) U.S. Cl. ........................................ 370/349; 370/474
(58) Field of Search ................................ 370/321, 332, 370/337, 347, 349, 465, 468, 471, 475, 474, 389, 392, 477; 455/561, 560, 393; 714/777, 784, 748

(56) References Cited

U.S. PATENT DOCUMENTS

| | | | | |
|---|---|---|---|---|
| 5,021,801 A | * | 6/1991 | Smith et al. ................ 343/876 |
| 5,553,074 A | * | 9/1996 | Acampora ................... 370/349 |
| 5,564,071 A | * | 10/1996 | Liou et al. .................. 455/56.1 |
| 5,577,087 A | * | 11/1996 | Furuya ........................ 375/377 |
| 5,640,395 A | * | 6/1997 | Hamalainen et al. ........ 370/337 |
| 5,729,541 A | * | 3/1998 | Hamalainen et al. ........ 370/337 |
| 5,742,588 A | * | 4/1998 | Thornberg et al. .......... 370/236 |
| 5,909,469 A | * | 6/1999 | Fordigh et al. ............. 370/465 |
| 5,991,286 A | * | 11/1999 | Labonte et al. ............. 370/337 |
| 5,995,492 A | * | 11/1999 | Klein et al. ................. 370/280 |
| 6,094,426 A | * | 7/2000 | Honkasalo et al. ......... 370/349 |
| 6,094,429 A | * | 7/2000 | Blanchette et al. ......... 370/337 |

* cited by examiner

Primary Examiner—Chau Nguyen
Assistant Examiner—Andy Lee
(74) Attorney, Agent, or Firm—Millen, White, Zelano & Branigan, P.C.

(57) ABSTRACT

A method of non-real-time two-way wireless data communications using a synchronous time division multiplexed architecture (TDMA) protocol in a communications system having a plurality of fixed base stations (BS) and a plurality of receiver/transmitters (RTs), wherein a BS controller dynamically changes a plurality of data blocks in both an uplink and a downlink data frame, a plurality of data rates, a plurality of signal modulation techniques, and a plurality of frequencies according to a computer analysis of received signals in order to provide optimization of the system. The method further includes overhead data reduction techniques using abbreviations for identification character strings and concatenations of downlink data messages. Embodiment of a novel emergency alarm resolution techniques and a plurality of message collision avoidance techniques improves response times for remote transmissions.

33 Claims, 6 Drawing Sheets

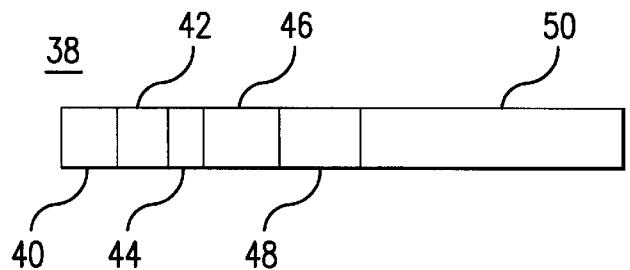
FIG.2
| BYTE VALUE | DEFINITION |
|---|---|
| 1 | GLOBAL UNIT COMMAND TO IGNORE 1 S-FRAME |
| 2 | GLOBAL UNIT COMMAND TO IGNORE 2 S-FRAMES |
| 3 | GLOBAL UNIT COMMAND TO IGNORE 3 S-FRAMES |
| 4 | GLOBAL UNIT COMMAND TO IGNORE 4 S-FRAMES |
| 5 | METER READ – NON-METER RTs TO IGNORE 1 S-FRAMES |
| 6 | MODULATION TYPE A |
| 7 | MODULATION TYPE B |
| 8 | ... |
FIG.2a
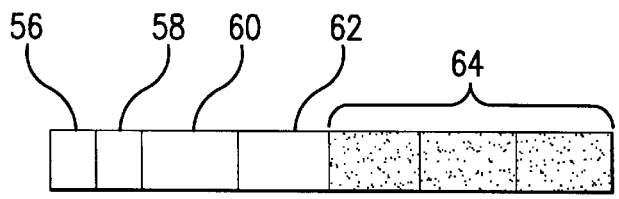
FIG.2b

66

| Bit Values | EIN value repeats | Example |
|---|---|---|
| 0000 | Following is a whole new EIN value | 1-312-555-1212 |
| 0001 | Repeat country code and area code | 1-312- |
| 0010 | Repeat 1$^{st}$ 5 digits | 1-312-5 |
| 0011 | Repeat 1$^{st}$ 6 digits | 1-312-55 |
| 0100 | Repeat 1$^{st}$ 7 digits | 1-312-555 |
| 0101 | Repeat 1$^{st}$ 8 digits  ←68 | 1-312-555-1 |
| 0110 | Decrement previous EIN value | 1-312-555-0 |
| 0111 | Increment previous EIN value | 1-312-555-1 |
|  |  |  |
|  | Other 4FB Definitions |  |
| 1000 | Cleanup Slot Area starts at time slot… |  |
|  |  |  |
| 1100 | Free-For-All Time starts at time slot… |  |
| 1101 | Auto Registration Time starts at time slot… |  |
| 1110 | Extra E-slot Block begins at time slot… |  |
| 1111 | End of Notification Cycle |  |

FIG.2c

SYSTEM AND METHOD FOR WIRELESS EXCHANGE OF DATA IN A NON-REAL-TIME DATA COMMUNICATIONS SYSTEM

FIELD OF THE INVENTION

The present invention pertains to the field of wireless data communications systems, and more specifically to a system and method for non-real time communication between a fixed base station and a plurality of remote transceivers.

BACKGROUND OF THE INVENTION

Wireless communications have become a principal means for exchanging data with geographically dispersed data collection or interfacing devices, such as utility meters or inventory control monitors. This significantly reduces the amount of time and manpower that were previously required for such data collection activities. However, as the number of remote devices increases, a single data conduit, such as a narrow frequency channel, becomes inadequate to carry the amount of information that must be transferred.

In the area of wireless two-way data communications between a base station (BS) and a plurality of remote receiver/transmitters (RTs), optimum use of the data channel is difficult to obtain due to both signal degradation characteristics of the transmission medium and the message collisions that occur when multiple RTs attempt to transmit on the same channel at the same time. Typical implementations involve a time-division-multiplexed architecture (TDMA) wherein the available time is partitioned between the plurality of RTs that are using the channel, such that each RT will have uncontested use of the channel for a finite period of time. As the number of the RTs using the channel grows, however, such an approach necessitates the reduction in the time allocated to each RT, resulting in a reduction in the data that can be transmitted. To alleviate such bandwidth reduction, various compression techniques are typically employed; however, these techniques add processing time at both ends of a communications link.

Due to the high number of errors that occur during high speed over-the-air data transmissions, sophisticated forward error correction (FEC) processing is needed to accurately reconstruct degraded messages. Typically, such FEC implementations add additional data bytes to the message, which uses up some of the bandwidth gained from the data compression. Further, common FEC algorithms, such as variations of Reed-Solomon, require significant processing time to make such data corrections, which significantly reduce battery life in portable RTs.

When the bandwidth of a communications channel becomes restricted, larger data messages and/or large numbers of transceivers cannot be used in a network without excessive message latency. One solution is to employ various interactive control techniques which allow multiple transceivers to use the same time slot. Typically, such techniques involve including specific RT identification (ID) addresses in a message to direct one or more RTs to process the remainder of the message and to transmit a return message at a specific future time. Such a return message might be an acknowledgement of satisfactory reception of the received message or a request for retransmission of all or a part of the message that could not be reconstructed.

Further, transmission time is partitioned into packets of typically one to 20 seconds in duration which are in turn partitioned into individually addressed messages. Such packet partitioning is usually required due to the need for physical adjustments of the transmission and receptions means, such as periodic data resynchronization of receivers, cooling of transmitters, etc. This partitioning allows all RTs operating on a common channel to examine a smaller portion of each message for a unique ID indicating that the RT is one of the intended recipients of the message. All other RTs monitoring the same message can return to a low power state without processing the remainder of the message, thus reducing undesired RT battery consumption. The drawback of such partitioning is that the ID address must be sent unprotected by FEC encoding leading to errors in the ID addresses.

For RT applications requiring a time mark or other group command, such as the initiation of a data logging process at a plurality of data sensing devices, a first portion of any ID address is typically a group identifier command which directs all RTs of that group to process the message. For other applications which require the uploading of data blocks, individual RTs will have to be addressed with a transmission time and block size allocation. These up-link transmissions can be timed to span several packets, and such applications are controlled by a scheduling means in the BS-computer.

A significant drawback of such a scheduling architecture is that another group of applications, such as application monitors and alarms, cannot gain immediate access to a channel, but cannot wait for a routinely scheduled transmission time slot for the RT. For such applications, time slots are usually reserved in the up-link packet, during which RT requests for transmission time are allowed. To avoid significant system inefficiencies, such time slots are kept small. However, this small time size can be detrimental if a large number of RTs initiate a request in the same time slot, in that two transmitted messages will collide and cancel each other.

Thus over-the-air two-way data communications systems having high data rates and a large number of RTs suffer significant drawbacks between the competing requirements of data accuracy, bandwidth availability and efficiency, and portable RT power consumption.

SUMMARY OF THE INVENTION

These and other problems are addressed by the present invention which comprises a system and method for non-real-time two-way wireless data communications. The system has a fixed base station (BS) and a plurality of remote receiver/transmitters (RTs) embodying a BS controller which dynamically selects the operating characteristics of the communications system and provides for efficient use of available bandwidth to maximize the number RTs capable of using a given channel. By dynamically changing a plurality of data blocks in a data frame, a plurality of data rates, a plurality of signal modulation techniques, and plurality of frequencies according to a computer analysis of the received signals, an optimum communications network is realized for a plurality of RT-linked applications.

An object of the present invention is to reduce the quantity of data transmitted in a forward link from a BS to a plurality of RTs through the use of abbreviations of the plurality of RT identification addresses (IDs), use of wildcards in the ID character fields to enable calls to groups of RTs, and concatenation (or head-to-tail joining) of a plurality of data blocks. Concatenation advantageously eliminates the need to fill messages with dummy data bytes to attain the fixed data block size which is typically required by sophisticated forward error correction (FEC) algorithms. Thus, for a serial data stream comprised of a plurality of fixed size error correction blocks, each FEC data block can include a plurality of concatenated messages. Alternatively, a single message can span several FEC data blocks, and only the trailing FEC data block may need to be filled with dummy data bytes.

Another object of the present invention is to provide a method for optimization of each of the plurality of RTs, wherein a plurality of data blocks are sequentially transmitted and each data block is modulated by a different one of a plurality of modulation techniques which are; arranged in ascending order from the simplest to the most sophisticated.

Another object of the present invention is to provide methods for avoiding message collision in a two way wireless communications system, wherein a plurality of RTs attempt to initiate unscheduled transmissions simultaneously. A first method employs a randomly generated number to select one of a plurality of possible time periods within a fixed transmission time period. Each RT from the plurality of RTs generates a unique random number each time it attempts an unscheduled transmission.

A second method uses a weighting equation which includes a message priority, a number representing the transmission attempts, and a random number.

A third method uses an expanded transmission time period. This method is used for those RTs which have exceeded a predetermined maximum number of attempted transmissions of the same message.

Another object of the present invention is to use variable sized data blocks for messages and message acknowledgements to improve system efficiency.

Another object of the present invention is to provide a method for using a fixed group of emergency alarm time periods each having a priority and wherein alarms are generated in one or more of the plurality of RTs.

Another object of the present invention is to provide a method for dynamically monitoring received signal strength to determine the presence of multiple transmission signals occurring within the same time period, which would indicate the corruption of a message.

BRIEF DESCRIPTION OF THE DRAWINGS

FIG. 2 shows a time sequence diagram of a first serial data bit stream (FSDBS) which is transmitted by a base station (BS) to a plurality of remote transceivers (RTs) according to the present invention.

FIG. 2a shows an exemplary table of modulation byte values contained in a preamble of the FSDBS signal.

FIG. 2b shows an expanded view of a header block of the FSDBS signal.

FIG. 2c shows an exemplary table containing a plurality of four fixed bit abbreviation codes which are used to reduce the amount of data required to be transmitted for equipment identification number recognition.

DETAILED DESCRIPTION OF THE PREFERRED EMBODIMENT

Figure 1:
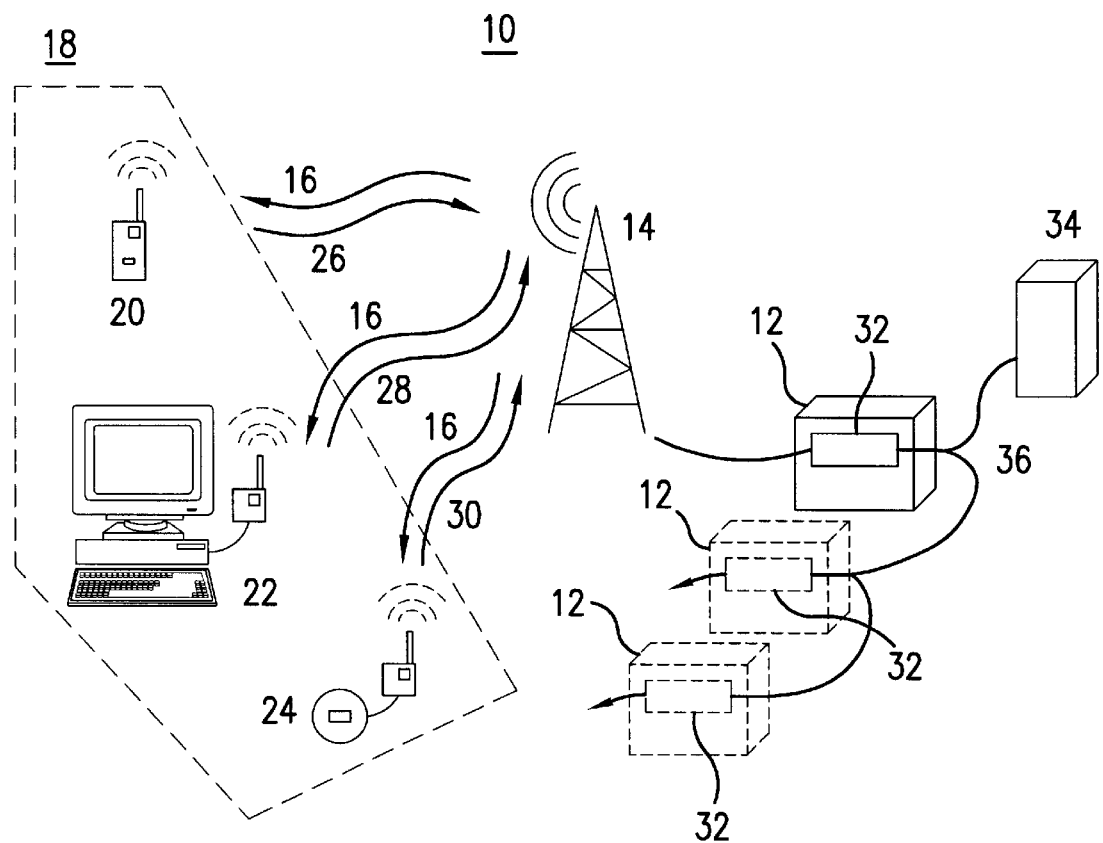
FIG. 1 shows a conventional point-to-multi-point communications system.

Referring now to the drawings, wherein the showings are intended to illustrate several preferred embodiments of the invention and not to limit same, FIG. 1 shows a point-to-multi-point communications system 10 comprising a fixed location Base Station (BS) 12 having an antenna tower 14 transmitting an over-the-air radio frequency (rf) signal 16 to a plurality of remote transceivers (RTs) 18 each having a unique identification address (ID). Typical examples of user applications for RTs 18 are a hand-held data RT 20, an RT connected to personal computer 22, and an RT 24 connected to a data collection device such as a utility meter. All the RTs 18 process signal 16 and selected ones of the RTs 18 transmit return signals 26, 28, and 30, for example, to BS 12 at a time and in a manner prescribed by the data content and signal quality of signal 16.

For example, if it is assumed that signal. 16 includes message portions that send a download data block to RT 20 and sends a meter reading request to RT 24. A return signal 26 originating in RT 20 could be an acknowledgement message indicating correct reception of the downloaded data block and a return signal 30 from RT 24 would contain an electric meter reading. Since more than one rf signal can not be satisfactorily transmitted simultaneously at a same frequency, the return link transmissions, 26 & 30 in this example, are multiplexed over time in accordance with directives contained in signal 16.

According to the present invention, at each transmission tower site, a plurality of BS's 12 typically will transmit over several channels simultaneously using a plurality of data rates and modulation techniques, each channel being controlled by a radio resource manager (RRM) 32 in each BS 12, which manages the dynamic aspects of communication with all of a separate plurality of RTs 18 operating on that channel. Each RRM 32 is coupled to a local system server (LSS) 34 via an interconnection cable 36 to transfer incoming and outgoing message traffic. LSS 34, which manages local system resources of the communications system, is further coupled to external communication means such as telephone lines and other cabled data transfer means (not shown) to exchange data with upstream controllers of the network. RRMs 32 are also coupled via interconnections between the plurality of BSs 12 to facilitate load sharing of messages between the separate RRMs 32.

Each RRM 32 controls the rf link physical communication means and message management means of both signal 16 transmitted by base station 12 and response signals transmitted by the plurality of RTs 18. For example, RRM 32 manages the message ordering and numbering, RT return transmission scheduling and notifications, message acknowledgements (ACK), and retransmission of unacknowledged messages. Each RRM 32 also performs the forward error correction (FEC) encoding and decoding and performs continuous analysis of rf signal quality in order to determine optimal system operating parameters.

The local system resources enable LSS 34 to construct the messages to be transmitted by each of the plurality of BS 12, determine said message priority and modulation technique, and manage the channel assignment details for the plurality of RTs 18 to control the site channel loading. For example, LSS 34 manages the system registration information for the plurality of RTs 18, assigns a particular channel and modulation technique to each RT, and steers a message to the controlling RRM 32 associated with said channel.

LSS 34 also can dynamically change the content of the forward link signal 16 and the reverse link signals, such as signal 26, 28, and 30, to enable transmission and reception of signals having a plurality of data rates, a plurality of messaging formats, and a plurality of modulation techniques. This control allows for communications to distant or mobile RTs at slower data rates and more coarse modulation techniques, while the communications to fixed and nearer RTs can be at higher data rates and higher complexity modulation techniques.

FIG. 2 shows a time sequence diagram of a first serial data bit stream (FSDBS) 38 of signal 16 shown in FIG. 1, which is transmitted by BS 12 to a plurality of RTs 18 according to the present invention. An exemplary signal 16 shown in FIG. 1 is 10.660 seconds in duration (i.e. a frame) and is partitioned into a plurality of data blocks that are arranged according to the present invention to provide for: a synchronization and initialization of all of the plurality of RTs 18 operating on that channel; a notification to each RT from the plurality of RTs 18 that are to process signal 16; and a transfer of data to said notified RTs. Any subsequent FSDBS signal 38 is sent immediately without any guard band between the different FSDBS signals 38.

An exemplary FSDBS signal 38 is comprised of:
a 33 millisecond preamble block 40 comprising: a 1.75 KHz tone for frequency synchronization and automatic gain control (AGC) in an RT; a unique data word giving the precise location of the start of the frame in FSDBS signal 38; and a modulation type byte comprised of 8 bits of data indicating the highest level of modulation to be transmitted in this FSDBS signal 38;
4 bits of conventional Hamming FEC parity code for correcting bit errors in the modulation type byte;
a 200 millisecond equalization block 42 wherein a diagnostic signal is provided to allow each of the plurality of RTs 18 to obtain performance information pertaining to the received signal.
a header block 44 containing six data bytes of system information;
a variable-length RT notification block 46 comprising one or more unique addresses each one corresponding to an equipment identification number (EIN) of an RT that will process the data in this FSDBS signal 38 and an offset to a specific starting location of a corresponding data block within this FSDBS signal 38;
a variable-length acknowledgement block 48 comprising receipt-acknowledgement messages directed to specific RTs that transmit a message in a previous time period;
a variable-length message block 50 comprised of a concatenated sequential arrangement of all messages that are being sent to the notified RTs. The concatenation optimizes the channel by arranging messages head to tail with no unused data bits in between; and
one or more reserved redundant group data blocks comprised of a plurality of RS error encoding data which enables the reconstruction of entire data blocks which may be missing or corrupted.

Preamble 40 is not encoded by an error-correction means to allow for reduced RT processing time for an initial determination by the RT whether it is excluded from processing the remainder of the message, and, thus, reduces battery consumption in the RT. The 4 bit Hamming Code following the preamble allows for rapid bit error correction in the modulation type byte in the preamble.

FIG. 2a shows an exemplary table 52 of modulation byte values that can be contained in preamble 40 shown in FIG. 2. The modulation type byte determines the highest modulation technique that is to be used to decode the following data within the FSDBS signal 38. For example, byte 54 of table 52 indicates "modulation Type A" which, in the described embodiment, is the highest modulation technique (8 PSK) to be used for processing the data in FSDBS signal 38.

Equalization block 42 allows the characterization of the receiver signal path of each of the plurality of RTs 18. For example, by providing an impulse during equalization block 42, the impulse response of the filters and down-converter stages of the RT receiver can be quantified. This information can be used to further optimize the operating points of the RT or can be transmitted back to BS 12 and LSS 34 for both RT and system characteristic recording.

FIG. 2b shows an expanded view of header block 44 of FSDBS signal 38. Header block 44 provides information to the RT regarding tower identification and frequencies available from the current and any adjacent towers. This allows for the selection of alternate communications paths that can be used if the RT cannot establish a communications link using a currently assigned channel. If such system information is larger than the space allocated within header 44, the information is transmitted in headers of subsequent FSDBS signal 38 until it is completely sent. Header block 44 is comprised of:
a four bit version number 56;
a four bit frame length for variable frames 58;
a byte wide tower number 60;
a byte wide frequency number with the system data and time 62; and
a three byte reserved field 64 to be used for future expansion.

Notification block 46 includes one or more short notification messages that are addressed to individual RTs from the plurality of RTs. Other access means to RTs can be through the use of one or more wildcard characters in the notification block ID, which would allow a message to be addressed to a group of RTs with a single notification block. Such group call messages would not be acknowledged by the individual RTs.

Since notification block 46 shown in FIG. 2 can become quite large when FSDBS signal 38 is sent to a large number of RTs having long EINs, a four bit fixed (4BF) abbreviation method is implemented according to the present invention wherein predetermined four-bit code words are substituted for a sequence of characters in an EIN, said sequence of characters being a duplicate of a sequence of characters that occurred in an immediately previous transmitted EIN. The four bit code words direct the plurality of RTs to store and repeat a specific number of characters from the previous EIN, and typically replace several characters of the EIN each having 8 data bits. Thus, the use of 4BF codes, coupled with an EIN sequence arranged in ascending order to facilitate said abbreviation method, significantly reduces the time required for transmission of the notification block and significantly improves the overall system transmission efficiency. Alternatively, the EIN sequence can be arranged in descending order to prevent the extra battery drain that would be associated with a group of RTs having larger EINs always having to wait in the powered-up monitoring state for the smaller EINs to be completed.

FIG. 2c shows an exemplary table 66 containing a plurality of predetermined 4BF abbreviation codes, which are used to reduce the amount of data required to be transmitted for EIN recognition. Concatenating the repeated sequence of characters with the data values that follows the 4BF code, a complete EIN is easily reconstructed, with significant reduction in transmission time.

For example, if it is assumed that the EINs that are sequentially transmitted correspond to a first transceiver having an EIN of 12345678-8 and a second transceiver having an EIN of 12345678-9, with each character having eight bits, a retransmission of the first eight redundant characters wastes valuable broadcast time, specifically, 64 data bit times. By using 4BF code '0101' shown as element 68 in table 66 as a substitution code symbol to be concatenated with the non-duplicated data that follows, a resulting transmitted data stream for the second EIN is comprised of 4BF prefix command+character "9", in this example. Thus, the cumulative transmission bit time for the two EINs is 72+12=84, for the first and second EINs, respectively, rather than 72+72=144 bit times for the unabbreviated data. Similarly, using 4BF code '0111' would have caused the EIN to increment by one producing a more compact result.

An additional advantage of arranging the sequence of EINs in ascending order, is that when a specific RT senses an EIN that is larger than its EIN, it can immediately return a low power mode, since no subsequent EIN values can be valid for this RT. This further contributes to improved battery life. Alternatively, if the ordering has been set to be descending, a sensing of a higher numbered EIN will inactivate the RT.

Such an abbreviation technique is not restricted to EIN values, but can be used for any number of data transmission applications where there exists significant repetitive information to be sequentially transmitted. A table comprised of 4BF codes can also be used as a table of system commands such as '0001'="next message begins at . . . " or '0002'= "registration time begins at . . . ", etc.

Figure 2D:
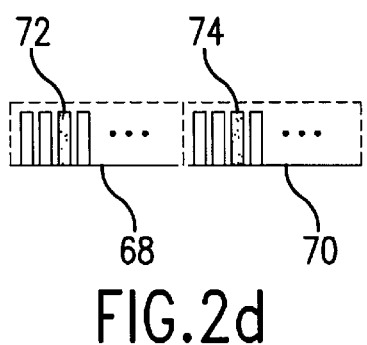
FIG. 2d shows an expanded view of an acknowledgement block of the FSDBS signal.

FIG. 2d shows an expanded view of acknowledgement (ACK) block 48 of FSDBS signal 38, comprising two portions. A first portion 68 comprises an ordered sequence of the 4BF-encoded EINs of those RTs from the plurality of RTs that transmitted data in a previous RT transmission time frame. A second portion 70 comprises a corresponding ordered sequence of message serial numbers and sequence numbers of segments in the corresponding message that were transmitted over multiple frames. These numbers, which were previously transmitted by the RT, indicate to the RT which blocks were acknowledged and which blocks were not acknowledged.

Acknowledgement can indicate that the block was received correctly, or, in the case of an RT request for transmission time, that the request has been granted, and the RT will monitor subsequent FSDBS signals 38 for a specific transmission time. A non-acknowledge (NAK) can indicate that the message block needs to be retransmitted by the RT, or that the transmission time request was not granted. An exemplary ACK shows an EIN 72 as being the third RT in the sequence of EINs of portion 68 and the corresponding ACK 74 as being the third ACK in the sequence of portion 70.

The message serial number is a 1-byte number that matches a number transmitted with the RT message during the previous cycle and the sequence number is a 7-bit number that was transmitted by the RT identifying each segment of a long message, which was transmitted over several frames. The most significant bit (MSB) of the sequence number can be set for a non-acknowledge (NAK) and cleared for an ACK. ACK block 48 portions 68, 70 will always start on a byte boundary, which will sometimes necessitate padding the previous notification block 46 with 0's.

In an exemplary embodiment, message block 50 of FSDBS signal 38 (FIG. 2) can have a length of from one to 1000 bytes, and individual RT messages are packed head-to-tail. Message serial numbers range from zero to 255 and message sequence numbers range from zero to 127.

Individual messages in message block 50 can be modulated by any one of a plurality of modulation techniques, with said messages being ordered in a sequence of groups, each group having a common modulation technique. The order of the groups can be from the least complex modulation technique to the most complex. For example, if it assumed that the types of modulation being used in message block 50 are from the group which includes Quadrature Phase Shift Keying (QPSK), Eight Phase Shift Keying (8PSK), and 16 Quadrature Amplitude Modulation (16QAM), all messages using QPSK modulation would be included in the first group, all messages using 8PSK would be in the second group, etc. The above are exemplary only and could include any one of a variety of IQ (relating to in-phase & quadrature-phase signals) or other modulation techniques. The ability to provide variable modulation types in the same forward link transmission provides the flexibility to optimize the use of the channel as described in the operation of LSS 34 in FIG. 1.

Since over-the-air transmissions have typically high bit error rates, to improve the transmission reliability and efficiency, the just described exemplary FSDBS signal 38 would be encoded using a FEC means. Thus, a Reed-Solomon (RS) 56/64 algorithm is implemented according to the present invention, where 56 is the number of data bytes transmitted and 64 is the final block byte size after encoding, or with 8 bytes of correction code being appended to the data block. This implementation can correct Rayleigh fading of up to 45 milliseconds, which is a phenomena that is characteristic of this type of communication system.

Messages in message block 50 are not restricted to a byte boundary of a FEC block. A FEC block may contain many messages or a single message may span several FEC blocks. Such contiguous message packing in message block 50 eliminates the need for filler code in all but the last of a sequence of RS blocks in message block 50, increasing the system efficiency.

However, since such a FEC implementation is processor time-intensive, a typical RT would have to consume significant amounts of battery power just to process messages that were not directed to it. Thus, according to the present invention, preamble block 40 is transmitted un-encoded by a FEC algorithm except for an appending of four bits of Hamming code to allow for rapid processing and a quick return of the RT to a low power standby mode based on the easily read modulation type byte.

Figure 3:
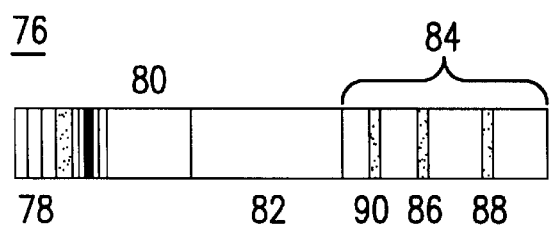
FIG. 3 shows a time sequence diagram of a second serial data bit stream (SSDBS) signal, which is transmitted by an exemplary RT to the BS according to the present invention.

FIG. 3 shows a time sequence diagram of a return second serial data bit stream (SSDBS) 76 of exemplary signal 26 shown in FIG. 1, one or more data blocks of which are transmitted at predetermined times by an exemplary RT 20 from the plurality of RTs 18 to a BS 12 according to the present invention. In an exemplary embodiment, each transmission of a data block by the RT is preceded by a 33 millisecond preamble comprising a 1.75 KHz frequency tone, which allows a receiver in BS 12 to synchronize to the transmitted signal. Multiplexed with a plurality of precisely timed transmissions of data blocks from a plurality of selected RTs using the same channel, a pseudo-collective SSDBS signal 76 is received in associated BS 12.

The modulation technique used by a particular one of the plurality of RTs 18 for transmitting a data block of SSDBS 76 can be any one of the plurality of modulation techniques that has been previously assigned to said RT by LSS 34. For example, if it assumed that the types of modulation being used for RT transmissions are from the group which includes QPSK, 8PSK, and 16QAM, exemplary RT 22 shown in FIG. 1 may be assigned QPSK modulation and exemplary RT 24 may be assigned 16 QAM modulation. Thus, a pseudo-collective SSDBS signal 76 will include a plurality of data blocks using a plurality of modulation techniques.

An exemplary SSDBS signal 76 is 10,660 seconds in duration and is partitioned into a plurality of time slots that are arranged according to the present invention to provide for: a time period 78 for any prioritized emergency alarms (E-slot); a time period 80 for RT 20 acknowledgement of previous BS 12 messages (R-ACK); time period 82 for scheduled reverse link transmission (SRLT) for transmitting messages according to directions previously transmitted by BS 12; and a time period 84 for unscheduled reverse link transmissions, or free-for-all (FFA). Thus, the transmission time period of SSDBS signal 76 is shared by any ones of the plurality of RTs 18 having reverse link transmissions pending, with each RT transmitting in a time-multiplexed manner according to scheduling instructions previously transmitted by BS 12, and wherein each such RT will transmit during one or more brief time periods an SSDBS signal 76.

For example, if RT 20 has been scheduled by BS 12 to transmit an ACK signal in R-ACK time slot #1 and RT 22 has both an emergency alarm condition and an ACK signal scheduled for R-ACK time slot #2, RT 22 will transmit the alarm message during E-slot 78, then temporarily cease transmitting while RT 20 transmits an ACK signal in R-ACK 80 slot #1 then turns off. RT 22 then transmits an ACK signal in R-ACK 80 slot #2. Any other RTs having scheduled ACK messages will transmit in a corresponding time slot in R-ACK 80.

Emergency alarm time period 78 is comprised of a group of eight emergency time slots (E-slots) each one having a different one of a plurality of priority levels and each one having a data size of one RS block, or 64 bytes in the exemplary RS 56/64 previously described. Said E-slots 86 are reserved for reverse link notification to BS 12 and LSS 34 that an emergency alarm condition exists at the corresponding priority level. Each E-slot 86 is comprised of the EIN of the RT and a message having a length of up to 56 characters. The message portion can include a description of the alarm or a request for additional transmission time to report an extended string of alarm conditions or longer messages. Depending on a specific application and the need for rapid reporting by the plurality of RTs 18, additional E-slots 78 can be allocated in SSDBS signal 76 by LSS 34.

In the event that more than one RT initiates a same priority alarm simultaneously, received-energy measurements being conducted by the channel RRM 32 will detect the increased energy at the particular priority E-slot 86, but not the information of the colliding signals, and RRM 32 will notify LSS 34 that multiple alarms are present at-that priority level. LSS 34 then masks all lower priority alarms and initiates a plurality of deductively arranged group calls during the next FSDBS signal 38 to identify the RTs that initiated the alarms. ACKs in R-ACK 80 of the following SSDBS signal 76 will verify the IDs of the initiating RTs, allowing LSS 34 to service the high priority alarms. The low priority alarm mask is then removed to allow the servicing of the lower priority alarms.

Emergency alarms take precedence over all other RT messaging activities. For example, if an exemplary RT 20 was in the process of receiving a message when the alarm condition occurred, RT 20 would cease processing the received message and prepare the alarm transmission for the next SSDBS signal 76. No ACK transmission would be sent by RT 20 in the next R-ACK 80, and LSS 34 would assume that the message was not correctly received and will automatically retransmit the message in a later FSDBS signal 38.

R-ACK 80 is comprised of a plurality of scheduled ACK signals, each one corresponding to a different one of the plurality of RTs 18 and each signal transmitted by the corresponding RT according to an ordered sequence of messages previously transmitted by BS 12. Each fixed length ACK signal of R-ACK 80 is separated by a 10 millisecond guard band and is comprised of a 33 millisecond preamble, a unique synchronization byte, and a three byte sequence comprised of the last four digits of the EIN of the RT plus eight bits of Hamming error correction code. Each one of the plurality of RTs 18 will calculate the appropriate transmission time period in SSDBS signal 76 for the unique ACK signal. For example, if it assumed that RT 20 received the first message of a previous signal 16 from BS 12, that RT 22 received the second message, and that RT 24 received the third message, the ACK transmission response sequence would be RT 20, followed by RT 22, then RT 24. In order to eliminate unnecessary duplication of transmitted data from the plurality of RTs, thus increasing available transmission time, an ACK in R-ACK 80 of a data collection command message can be eliminated since the transmission of a collected data block by said RT signifies that the RT satisfactorily received the command message.

SRLT 82 is comprised of an ordered plurality of error-correction encoded data blocks to be transmitted by each one of the plurality of RTs 18 which were granted scheduled transmission time in the previous FSDBS 38 of signal 16 shown in FIG. 1 and transmitted by BS 12. No RT which has not been granted scheduled transmission time will transmit during SRLT 82. Messages transmitted during SRLT 82 will be acknowledged during the next FSDBS 38 of signal 16 transmitted by BS 12. Message data size for the particular SSDBS signal 76 is determined by LSS 34, with some messages spanning several SSDBS signals 76, and with some having a minimum data block size being the size required by the error correction encoding algorithm. Further, transmission times of SRLT 82 may be scheduled in response to RT requests for transmission, LSS 34 commands to retransmit specific data blocks in messages that were not received correctly, or routine scheduled commands for data collection or reporting by RTs.

FFA 84 is comprised of a plurality of fixed time periods of predetermined size using a modified conventional aloha architecture and is the only time period that any of the plurality of RTs 18 can initiate a transmission without receiving a scheduled transmission grant from BS 12 and LSS 34. An exemplary time period can be 100 milliseconds when using one of the exemplary modulation techniques, such as 8PSK, at a frequency of 5 kilohertz, and can be shorter or longer using a different modulation technique at the same frequency.

The start of FFA time period 84 was prescribed in notification block 46 of previous FSDBS signal 38 using an exemplary 4BF code from the table shown in FIG. 2c, specifically bit values 1101. Any one of the plurality of RTs having messages to be transmitted in FFA 84 monitors said notification block 46. Since any one or more of the plurality of RTs 18 can transmit a message during this time period, to avoid the collisions resulting from simultaneous transmission of one or more of the plurality of messages, each RT monitors the previous FSDBS signal 38 to determine the start location of FFA 84, calculates a random number corresponding to a time period 86 from the plurality of time periods in FAA 84, and transmits a single message to BS 12 during said calculated period.

Said message is comprised of a preamble, a unique word, and one RS-sized block of data (50 characters). If the message cannot be completely included in the 50 character restriction, the message will include a request for a scheduled message time, and the RT will save the remainder of the message for transmission at said scheduled time when granted by LSS 34. In the event that the sending RT does not receive an ACK or NAK in the following FSDBS 38 of signal 16 transmitted by BS 12, the RT will assume that the message collided with another transmission and will recalculate a new random time period 88 and retransmit the entire message in the next SSDBS signal 76. After two consecutive collisions, the RT will calculate a new time period 90 using the equation $$T = \frac{(R + 150)}{P \times N} \quad [1]$$

Where T is the integer number of an FFA time period 90 from the plurality of FFA time periods, R is a random integer number from 0 to 255, P is the priority of the message to be transmitted, and N is the number of transmissions previously attempted for said message.

After eight failed attempts using equation [1], the RT will transmit a request in a special FFA "cleanup" period which is generated by RRM 32 upon receipt at BS 12 of repeated unintelligible collision messages in one or more FFA 84 time periods. The ten random time periods will provide a high probability of transmission success which will far exceed the channel bandwidth capacity of up to 250,000 RTs per channel.

According to the present invention, the bandwidth allocated to FFA 84 is dynamically determined by RRM 32. For example, if there are no scheduled messages for inclusion in SRLT 82 of SSDBS 76 or there are a high numbers of FFA requests, LSS 34 can allocate the entirety of SRLT 82 as an FFA 84 time period, further reducing the probability of message collisions.

SSDBS signal 76 can be configured by LSS 34 using a special arrangement of the time periods for data collecting applications since a plurality of data collection RTs will all transmit identically formatted data blocks each having unique readings. A request for data readings can begin with a modulation byte being set to "Meter Read—non-meter RTs to shut down" as as exemplified by Byte value 5 shown in FIG. 2a. This will momentarily suspend any non-meter RT from initiating any transmission activity for emergency alarms, ACKs, and FFA requests. The SSDBS signal 76 can then be partitioned by LSS 34 entirely with transmission time slots, during which each data collection RTs whose ID was included in FSDBS signal 38 will transmit a data block. Neither the plurality of data collection RTs nor LSS 34 will send ACK messages in this notification-reporting exchange, since LSS 34 will respond to any incorrect or missing data block with the inclusion of the particular RT on a later "meter reading" notification block. After a predetermined number of unsuccessful attempts to read a particular data collection RT, LSS 34 can flag the meter as being inoperable.

Alternatively, SSDBS signal 76 can be dynamically re-configured by LSS 34 to include a time period for RT registration, wherein RTs can switch to an alternate base station upon entering a new service area or can switch to a new channel to obtain a better quality signal. Such registration period permits the network controllers, such as LSS 34 and upstream computers, to track a mobile RT to provide for message forwarding. Similar to the actions relating to FFA 84 transmission, an RT requiring re-registration will monitor the notification block of FSDBS signal 38 for a 4BF code prescribing the start time of the registration time period in SSDBS signal 76, bit values 1101 in the table shown in FIG. 2c, for example. The registering RT will then calculate a random transmission time slot from the plurality of time slots within this registration time period. After generating a data bit stream comprising a 33 millisecond preamble and the RS encoded registration data block, the RT transmits the bit stream at the calculated transmission time. The RT monitors the following FSDBS signals 38 for an ACK from BS 12 to the registration message and the necessary system information required for completion of the registration activity. Message collisions during registration transmissions are handled in the same manner as that of the transmission of an FFA 84 block.

Figure 4:
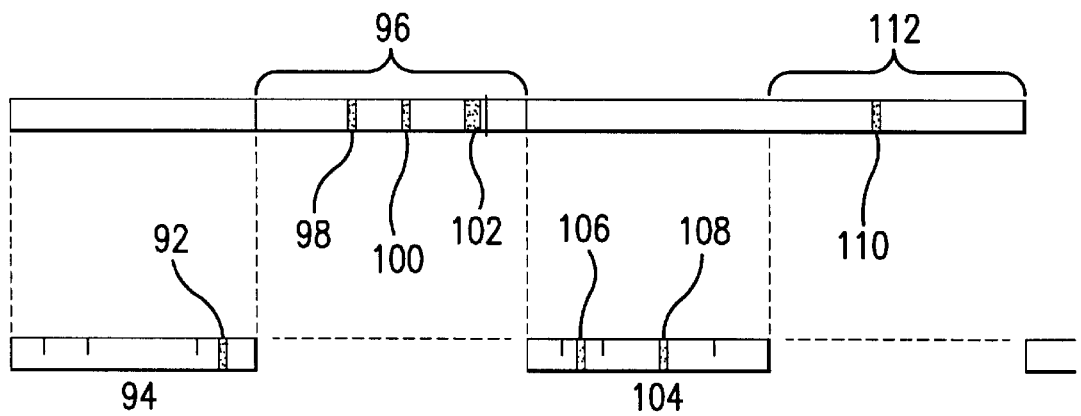
FIG. 4 shows an exemplary exchange of data between the BS and an RT.

To better understand the interactive aspects of the just described protocol, FIG. 4 shows an exemplary exchange of data between the BS 12 and an RT 20. RT 20 transmits an FFA request 92 to BS 12 and LSS 34 in an SSDBS signal 94. Upon satisfactory reception of FFA request 92, LSS 34 generates a FSDBS signal 96 containing a notification block 98 with the EIN corresponding to RT 20 indicating a message is included in the FSDBS signal, an ACK signal 100 accepting the previous SSDBS signal 92, and a message 102 containing the time and size of the allowed transmission. BS 12 transmits FSDBS signal 96 to RT 20. RT 20 receives FSDBS signal 96 and extracts data signals 98, 100, and 102. RT 20 then creates an SSDBS signal 104 containing an ACK block 106 and the reverse link message 108. BS 12 and LSS 34 process the received message, and RRM 32 incorporates an ACK signal 110 in a new FSDBS 112.

Figure 5:
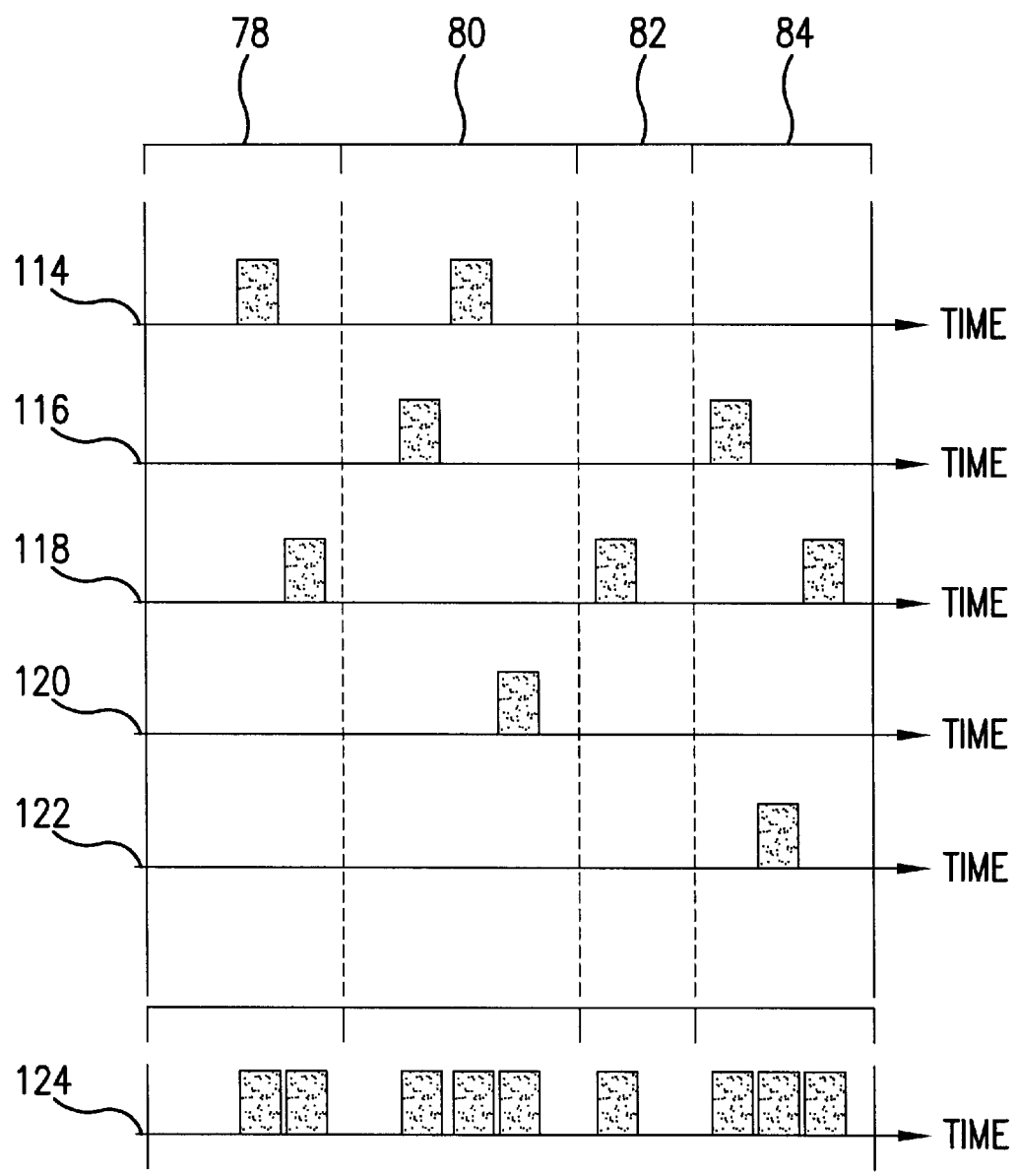
FIG. 5 shows a group of independent RT transmissions in an SSDBS time period and the resultant SSDBS signal received at the BS.

FIG. 5 shows a group of independent RT transmissions in an SSDBS time period and the resultant SSDBS signal received at the BS. An exemplary group of RTs from the plurality of RTs are each transmitting one or more data blocks at predetermined times in the SSDBS time period. Time plot 114 shows a first RT transmission of an E-slot data block in emergency time period 78 and an ACK data block in ACK time period 80. Time plot 116 shows a second RT transmission comprised of an ACK and an FFA request data block. Time plot 118 comprises an E-slot, a scheduled transmission, and an FFA data block. Time plot 120 comprises simply an ACK data block and Time plot 122 simply an FFA request.

Since time plots 114 through 122 occur during the same SSDBS time period, the cumulative signal received by BS 12 is shown in time plot 124, wherein there are two E-slot alarms, three ACKs, one scheduled message and three FFA requests for transmission times. These plots are intended as exemplary only, and are simplified for explanation purposes. In actuality, to optimize the bandwidth utilization, an SSDBS time period will contain many more such transmitted data blocks.

Figure 6:
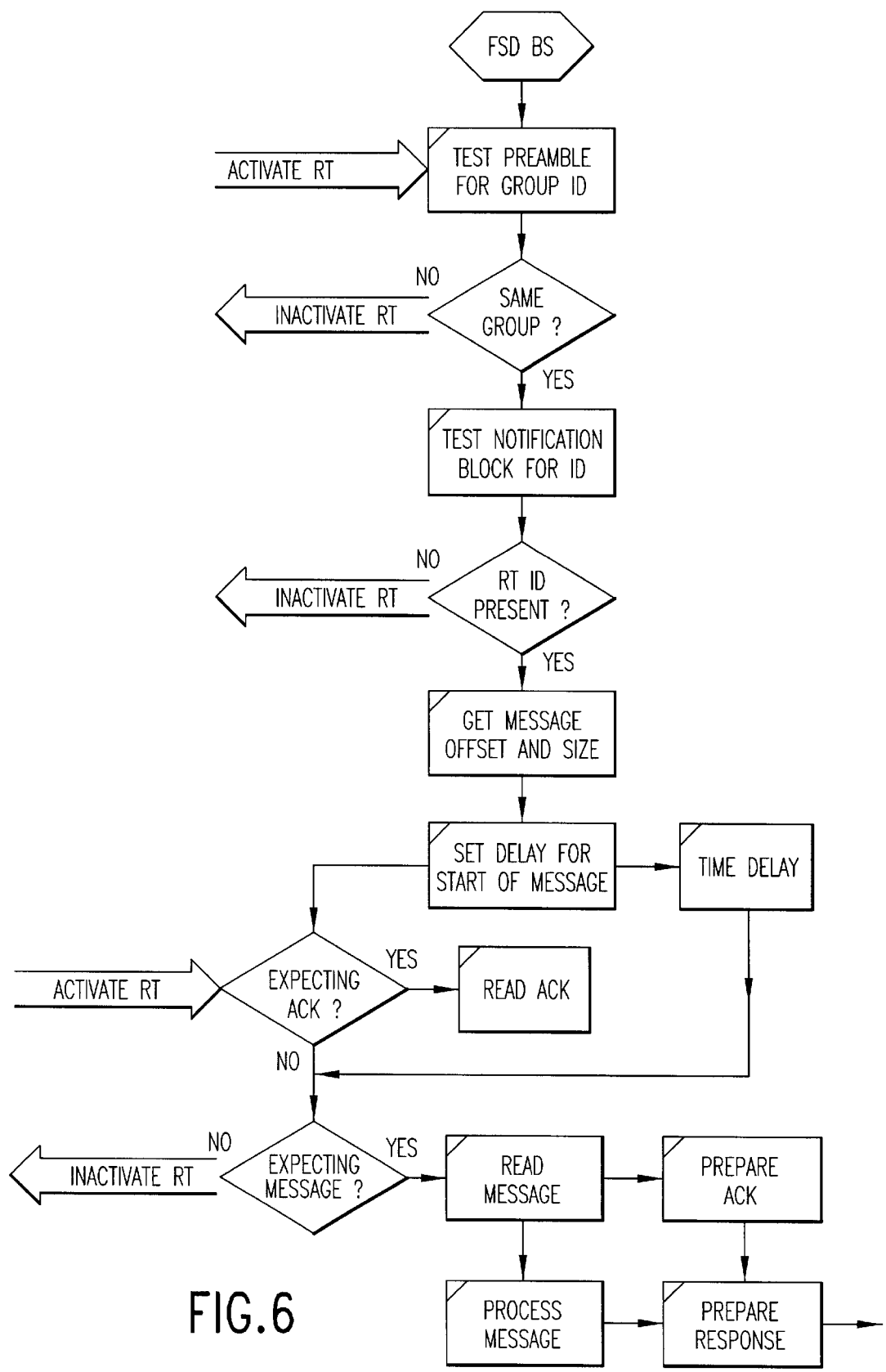
FIG. 6 shows a flowchart of the FSDBS processing steps used in a typical Rt.

FIG. 6 shows a flowchart of the FSDBS processing steps used in a typical RT. To preserve batery power, each RT will typically be in an inactive, low power mode until an RT receiver RSSI signal activates the RT to begin processing the FSDBS signal 38. An immediate examination of the modulation type byte of preamble 40 reveals if a group of RTs are not being addressed via a unique group address, such as that exemplified by byte value 5 of FIG. 2a, and can return to The inactive mode. Any remaining RTs will process the remainder of the FSDBS signal 38. Any of these remaining RTs will examine notification block 46 for a corresponding ID, and return to the inactive mode if said ID is not included. The remaining RTs will process the corresponding ACK or message data blocks. For scheduled messages, an RT will activate an internal timer to mark the point where it can begin transmission of the message. For NAK responses, an RT will retransmit a previous message block that was not acknowledged at the same time slot as previously scheduled LSS 34 in BS 12 tracks and schedules all time slots to prevent scheduling conflicts.

All RTs that have emergency or FFA request messages will activate at the appropriate times to send the corresponding signals, regardless of the content of the FSDBS signal 38. For all RTs that received messages, an ACK/NAK response will be generated and readied for transmission at the assigned time slot. For all RTs that received instructions, such as a status report command or a data collection command, the appropriate message block will be generated for transmission at the assigned time slot.

Numerous modifications to the alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the claims is reserved.

What is claimed is:

1. In a two-way wireless communications system comprising a plurality of base stations (BS) under control of a computer and a plurality of receiver/transmitters (RTs), wherein each of said BS includes a radio resource manager (RRM) controlling a single frequency, and each of said RTs has a unique identification address (ID), a method for transferring data from said BS to one or more of said plurality of RTs, comprising the steps of:

creating a plurality of serial data bit stream (SDBS) signals in said computer, each of said SDBS signals comprising an unencoded preamble data packet identifying a unique group address of one or more of said RTs; a 4 bit Hamming Code for correcting a single byte in the preamble; and an encoded frame data packet which includes an RT notification data block;

transferring each one of said plurality of SDBS signals to one of said RRMs;

transmitting said plurality of SDBS signals;

receiving said SDBS signals in each of said RTs; and, decoding said encoded frame data packet of a signal only in RTs identified in the notification data block.

2. The method according to claim 1, wherein said encoded frame data packet is encoded using a Reed-Solomon (RS) 56/64 encoding algorithm.

3. The method according to claim 1, wherein said unencoded preamble data packet comprises:

a frequency tone which is used for automatic gain control (AGC) and frequency calibration in the RT;

a first data word which describes an offset to a precise starting location of said frame data packet; and a second unique data word indicating the most complex one of a plurality of modulation techniques that characterize said frame data packet in said SDBS signal.

4. The method according to claim 1, wherein said encoded frame data packet comprises:

a transceiver equalization data block;

a header block;

a transceiver notification data block comprising a plurality of IDs each one corresponding to a destination RT;

an acknowledgment (ACK) block;

a message data block; and a reserved redundant group data block.

5. The method according to claim 4, wherein said transceiver equalization data block comprises a finite time period wherein are transmitted one or more signals designed to stimulate a characterization response in each one from the plurality of RTs.

6. The method according to claim 5, wherein at least one of said one or more signals is a pulse.

7. The method according to claim 4, wherein said header block comprises:

an identification name of said base station;

a listing of a plurality of transmission frequencies available at said base station;

a listing of a plurality of transmission frequencies available at a plurality of alternative base stations which are adjacent to said base station;

a calendar date; and a time.

8. The method according to claim 7, wherein any data intended for inclusion in said header block that exceeds a predetermined bit length of said header block will be included in the header block of subsequent SDBS signals.

9. The method according to claim 4, wherein said plurality of IDs in the notification data block comprises a sequence of one or more of a plurality of equipment identification numbers (EINs), each EIN corresponding to a unique one of said plurality of RTs and each EIN being encoded using an abbreviation means.

10. The method according to claim 9, wherein said abbreviation means comprises a substitution of a predetermined number of sequential characters in an EIN by a four bit fixed (4BF) code word from a plurality of 4BF code words, each code word corresponding to the predetermined number of sequential characters which were included in a preceding EIN.

11. The method according to claim 4, wherein said acknowledgment block comprises a predetermined sequential arrangement of one or more of a plurality of ACK messages which are addressed to a corresponding one or more of said plurality of RTs, wherein each ACK message comprises:

a preamble including a synchronization character; and an address which corresponds to a unique RT and which includes at least a portion of the ID of said RT.

12. The method according to claim 11, wherein said sequential arrangement of said plurality of ACK messages is identical to the sequential arrangement of the plurality of messages included in said SDBS signal.

13. The method according to claim 4, wherein said message data block comprises a plurality of variable-length messages concatenated without regard to error-correction block boundaries, each message being directed to selected ones of said plurality of RTs.

14. The method according to claim 4, wherein said reserved redundant group data block comprises a plurality of duplicate error correction blocks which enable the reconstruction of entire data blocks that may be lost in transmission.

15. In a two-way wireless communications system comprising a plurality of base stations (BS) controlled by a computer and a plurality of receiver/transmitters, (RTs), wherein each of said RTs has a unique identification address, a method for transferring data from each of said plurality of RTs to said BS, comprising the steps of:

receiving a serial data bit stream (SDBS) signal comprising an unencoded preamble data packet identifying a unique group address of one or more or said RTs; a 4 bit Hamming Code for correcting a single byte in the preamble; and an encoded frame data packet which includes an RT notification data block identifying one or more of said RTs;

processing said SDBS signal by a first decoding means in the RT to determine the presence of a data block specifically addressed to said RT;

determining by a selection means if said RT is required to transmit a message;

creating in said RT, if said RT is required to transmit said message, one or more data blocks, each one of said data blocks being preceded by a fixed frequency tone having a finite duration and each of said data blocks being encoded by an error correction means;

transmitting each one of said data blocks at a predetermined time on a predetermined frequency; and, receiving said plurality of data blocks by said BS as a second serial data bit stream (SSDBS) signal.

16. The method according to claim 15, wherein the first decoding means comprises the steps of:

processing a first portion of said SDBS signal to determine the presence of an inactivation code;

terminating for a predetermined time period the processing of said SDBS signal by any ones of said plurality of RTs which did receive said inactivation code;

processing a second portion of said SDBS signal using an error correction algorithm to un-encode the data land to determine the presence of an ID corresponding to a particular one RT from said plurality of RTs;

terminating the processing of said SDBS signal by any ones of said plurality of RTs which did not receive said ID; and processing the entirety of the second portion of said SDBS signal in each one of said plurality of RTs that have not terminated the processing of said SDBS signal.

17. The method according to claim 15, wherein said selection means comprises a method for determining which ones of said plurality of RTs is required to transmit one or more of a plurality of data blocks from a group comprising:

a prioritized emergency slot data packet if said RT has a pend prioritized emergency message to be sent;

an acknowledgement data packet comprising an acknowledgement messages containing an error status signal corresponding to a message included in said SDBS s if said message was addressed to said RT;

previous message data packet if said RT received a re-transmit command in said SDBS signal;

a message data packet if said RT received a command to transmit data in said SDBS signal;

a message data packet if said RT received an approval to transmit in said SDBS signal; and a reverse link Free-for-all (FFA) data packet wherein a message requesting transmission time allocation is randomly placed at a time location within the packet if said RT requires such a transmission allocation.

18. The method according to claim 15, wherein said SSDBS signal comprises:

a prioritized emergency data packet;

an acknowledgement (ACK) data packet;

a scheduled message data packet;

a reverse link Free-For-All (FFA) data packet; and a optional registration data packet.

19. The method according to claim 18, wherein said prioritized emergency data packet comprises a plurality of time periods (E-slots) each having a data size corresponding to a data block size required by said error-correction means, each E-slot being used for an alarm signal that is initiated by the RT when an alarm condition exists.

20. The method according to claim 19, wherein each of said E-slot comprises an ID of the RT initiating the alarm and an optional message.

21. The method according to claim 20, wherein said optional message includes one or more from the; group comprising:

a request for scheduled transmission time to transmit a message having a size larger than the fixed time periods of the E-slot;

a report describing the alarm; and a report describing and extended string of alarm conditions or messages.

22. The method according to claim 19, wherein the number of said E-slots can be dynamically changed by said computer.

23. The method according to claim 18, wherein simultaneous transmissions of an emergency alarm in a same E-slot by two or more RTs from said plurality of RTs are sensed by a detection means in said BS and corrected by a method comprising the steps of:

transmitting by the BS a plurality of group messages selectively configured to quickly elicit a response from only the RTs that are transmitting priority emergency alarms in that particular E-slot;

receiving the group messages;

determining by each one of said RTs if said RT is a deduced RT;

transmitting a randomly placed acknowledgment (ACK) message by only the deduced RTs;

transmitting by the BS a SDBS signal which includes scheduled transmission times to said acknowledging RTs;

receiving the scheduling transmission times messages; and transmitting the alarm messages by said RTs using a controlled non-colliding method.

24. The method according to claim 23, wherein said detection means comprises an algorithm in a corresponding RRM, which determines that a received signal strength is sufficiently greater than a received signal strength of a single signal, such that an E-slot message collision has occurred and that correcting methods should be invoked.

25. The method according to claim 18, wherein said ACK data packet comprises a sequential ordering of ACK messages according to the message sequence of said SDBS signal, and wherein each ACK data packet comprises:

a preamble including a synchronization character; the last 4 digits of said RT EIN; and an ACK message indicating an ACK for a satisfactory reception of a message in said SDBS or a non-acknowledgement (NAK) for a unsatisfactory reception of said message.

26. The method according to claim 18, wherein said ACK data packet can have a zero byte data length, whereby a scheduled transmission of data by a unique one of said plurality of RTs corresponds to an ACK of said SDBS message.

27. The method according to claim 18, wherein said scheduled message data packet comprises a plurality of data blocks, each data block being transmitted by a selected RT according to one of a plurality of transmission scheduling data signals included in said SDBS signal, each said data blocks being partitioned into one or more sub-blocks having a size corresponding to a size required by said error correction means.

28. The method according to claim 18, wherein said registration data packet comprises a 33 millisecond preamble and a data block which includes a request for a change in operating channels or a change in BSs in the communications system.

29. The method according to claim 18, wherein said registration data packet is transmitted at a randomly calculated time in a predetermined time period specifically allocated for registration transmissions by said computer.

30. The method according to claim 29, wherein said randomly calculated time in the registration data packet is 100 milliseconds in duration.

31. In a two way wireless communications system comprising a base station (BS) and a plurality of receiver/transmitters (RTs), each of said RTs sending an emergency signal when an emergency condition is detected, a method for determining that first and second emergency messages have been received simultaneously from a first and second one of said plurality of RTs and causing said first and second RTs to resend said first and second messages at different times comprising the steps of:

receiving a signal at said BS;

determining by said BS that the signal strength of said signal during a transmission time slot is greater than a signal strength of a single RT transmission signal;

transmitting by said BS a plurality of group messages requesting a response from only RTs that are transmitting priority emergency alarms in said transmission time slot;

receiving by said plurality of RTs said group messages;

transmitting an acknowledgement (ACK) message to said BS by only said RTs that transmitted an emergency alarm in said time slot;

transmitting by said BS a signal including scheduled transmission times to said acknowledging RTs; and transmitting the alarm messages by each of said RTs in a controlled non-colliding manner at the corresponding scheduled transmission time.

32. A two-way wireless communications system for transferring data from one or more of a plurality of base station to one or more of a plurality of receiver/transmitters each having a unique identification address, said system further comprising:

a computer for controlling said base stations;

a radio resource manager associated with each base station for controlling a single frequency in its associated base station;

means for creating a plurality of serial data bit stream signals in said computer, each of said serial data bit stream signals comprising an unencoded preamble data packet identifying a unique group address of one or more of said receiver/transmitters; a four-bit Hamming Code for correcting a single byte in the preamble; and, an encoded frame data packet which includes receiver/transmitters notification data block;

means for transferring each one of said plurality of serial data bit stream signals to one of said radio resource managers;

means for transmitting said plurality of serial data bit stream signals;

means for receiving said serial data bit stream signals in each of said receiver/transmitters; and, means for decoding said encoded frame data packet of a signal only in receiver/transmitters identified in said notification data block.

33. In a two-way wireless communication system for transferring data from one or more of a plurality of receiver/transmitters to one or more of a plurality of base stations said system comprising:

a plurality of said base stations controlled by a computer and a plurality of said receiver/transmitters wherein each of said receiver/transmitters has a unique identification address; and means for receiving a serial data bit stream signal comprising an unencoded preamble data packet identifying a unique group address of one or more of said receiver/transmitters;

a four-bit Hamming Code for correcting a single byte in said preamble; and, an encoded frame data packet which includes a receiver/transmitters notification data block identifying one or more of said receiver/transmitters;

means for processing said serial data bit stream signal by a first decoding means in a given receiver/transmitter to determine the presence of a data block specifically addressed to said given receiver/transmitter;

a selection means for determining if said receiver/transmitters is required to transmit a message;

means for creating in a given receiver/transmitter, if said given receiver/transmitter is required to transmit a message, one or more data blocks, each one of said data blocks being preceded by a fixed frequency tone having a finite duration and each of said data blocks being encoded by an error correction means;

means for transmitting each one of said data blocks at a predetermined time on a predetermined frequency; and means for receiving said plurality of data blocks by said base station as a second serial data bit stream signal.

* * * * *

UNITED STATES PATENT AND TRADEMARK OFFICE
CERTIFICATE OF CORRECTION

PATENT NO. : 6,567,397 B1  Page 1 of 1
DATED : May 20, 2003
INVENTOR(S) : Thomas J. Campana, Jr., et al.

It is certified that error appears in the above-identified patent and that said Letters Patent is hereby corrected as shown below:

<u>Title page,</u>
Item [73], Assignee, reads "Burridge," should read -- Burr Ridge, --

<u>Column 13,</u>
Line 61, reads "a first data" should read -- a first unique data --

<u>Column 15,</u>
Line 7, reads "or more or said" should read -- or more of said --
Line 35, reads "data land" should read -- data and --
Line 50, reads "pend prioritized" should read -- pending prioritized --
Line 53, reads "SDBS s if" should read -- SDBS signal, if --
Line 55, reads "previous message" should read -- a previous message --

<u>Column 16,</u>
Line 5, reads "a optional" should read -- an optional --
Line 13, reads "said E-slot" should read -- said E-slots --
Line 23, reads "and extended" should read -- an extended --

<u>Column 17,</u>
Line 53, reads "base station" should read -- base stations --

<u>Column 18,</u>
Line 44, reads "transmitters" should read -- transmitter --

Signed and Sealed this

Twenty-eighth Day of December, 2004

JON W. DUDAS
*Director of the United States Patent and Trademark Office*